United States Patent
Ge

(10) Patent No.: US 8,839,357 B2
(45) Date of Patent: Sep. 16, 2014

(54) METHOD, SYSTEM, AND COMPUTER-READABLE STORAGE MEDIUM FOR AUTHENTICATING A COMPUTING DEVICE

(75) Inventor: Jiuyuan Ge, Centereach, NY (US)

(73) Assignee: Canon U.S.A., Inc., Melville, NY (US)

( * ) Notice: Subject to any disclaimer, the term of this patent is extended or adjusted under 35 U.S.C. 154(b) by 339 days.

(21) Appl. No.: 12/976,991

(22) Filed: Dec. 22, 2010

(65) Prior Publication Data

US 2012/0167169 A1 Jun. 28, 2012

(51) Int. Cl.
*H04L 29/06* (2006.01)
*H04L 9/32* (2006.01)

(52) U.S. Cl.
CPC .............. *H04L 9/3271* (2013.01); *H04L 9/321* (2013.01)
USPC ................. 726/2; 380/44; 380/272; 380/273; 713/155; 713/165

(58) Field of Classification Search
CPC .............................. H04L 9/3271; H04L 9/321
USPC .......... 726/2; 380/44, 272, 273; 713/155, 165
See application file for complete search history.

(56) References Cited

U.S. PATENT DOCUMENTS

| | | | | |
|---|---|---|---|---|
| 6,128,742 A * | 10/2000 | Felt | ................................... | 726/5 |
| 7,065,579 B2 * | 6/2006 | Traversat et al. | ............. | 709/230 |
| 7,082,200 B2 * | 7/2006 | Aboba et al. | .................. | 380/273 |
| 7,136,996 B2 | 11/2006 | Aoshima et al. | | |
| 7,188,254 B2 | 3/2007 | Somin et al. | | |
| 7,409,552 B2 * | 8/2008 | Buttyan et al. | ................ | 713/172 |
| 7,519,815 B2 * | 4/2009 | Morris et al. | ................. | 713/168 |
| 7,523,490 B2 * | 4/2009 | Guo et al. | ........................ | 726/10 |
| 7,529,267 B2 * | 5/2009 | Tyan et al. | ..................... | 370/452 |
| 7,561,551 B2 * | 7/2009 | Metke et al. | .................. | 370/331 |
| 7,574,599 B1 | 8/2009 | Zhang | | |
| 7,581,095 B2 * | 8/2009 | Billhartz | ........................ | 713/168 |
| 7,603,700 B2 * | 10/2009 | Cheng et al. | ....................... | 726/5 |
| 7,640,573 B2 * | 12/2009 | Della-Libera et al. | ............. | 726/1 |
| 7,644,275 B2 * | 1/2010 | Mowers et al. | ............... | 713/168 |
| 7,681,033 B2 | 3/2010 | Miura et al. | | |
| 7,689,824 B2 | 3/2010 | Imaizumi et al. | | |
| 7,698,381 B2 * | 4/2010 | Brezak et al. | ................. | 709/219 |

(Continued)

OTHER PUBLICATIONS

Software AG, MIME-S/MIME Developer's Guide, Version 8.0, Dec. 2009.

(Continued)

*Primary Examiner* — David Garcia Cervetti
(74) *Attorney, Agent, or Firm* — Canon U.S.A., Inc. IP Division

(57) ABSTRACT

A method, system, and computer-readable storage medium for authenticating a computing device are provided. According to embodiments of the invention, a first computing device generates a message using first secret data and second secret data, the first secret data for authenticating to a second computing device, the second secret data for authenticating to a third computing device. The first computing device sends the message to the second computing device. In some embodiments, challenge-response authentication is implemented. For example, the first computing device receives a challenge from the second computing device and generates the message based at least in part on the challenge. The second computing device compares local information with information received from the first computing device. The first computing device can thereby be authenticated to the second computing device. Furthermore, the first computing device can be authenticated to the third computing device by a similar process.

28 Claims, 9 Drawing Sheets

(56) References Cited

U.S. PATENT DOCUMENTS

| | | | |
|---|---|---|---|
| 7,725,719 B2* | 5/2010 | Sandberg et al. | 713/170 |
| 7,735,120 B2 | 6/2010 | Wallace et al. | |
| 7,769,996 B2 | 8/2010 | Randle et al. | |
| 7,971,240 B2* | 6/2011 | Guo et al. | 726/10 |
| 8,190,894 B2* | 5/2012 | Sandberg et al. | 713/170 |
| 8,272,039 B2* | 9/2012 | Bennett et al. | 726/7 |
| 2002/0199096 A1* | 12/2002 | Wenocur et al. | 713/153 |
| 2003/0044020 A1* | 3/2003 | Aboba et al. | 380/278 |
| 2003/0105812 A1* | 6/2003 | Flowers et al. | 709/203 |
| 2003/0188193 A1* | 10/2003 | Venkataramappa | 713/201 |
| 2004/0062400 A1* | 4/2004 | Sovio et al. | 380/286 |
| 2004/0107354 A1* | 6/2004 | Larsen | 713/189 |
| 2004/0117623 A1* | 6/2004 | Kalogridis et al. | 713/165 |
| 2004/0128510 A1* | 7/2004 | Larsen | 713/171 |
| 2004/0172533 A1* | 9/2004 | DeMello et al. | 713/164 |
| 2004/0205344 A1* | 10/2004 | Otway et al. | 713/169 |
| 2004/0210756 A1* | 10/2004 | Mowers et al. | 713/168 |
| 2004/0243832 A1* | 12/2004 | Wilf et al. | 713/200 |
| 2005/0207440 A1* | 9/2005 | Tyan et al. | 370/454 |
| 2006/0026433 A1* | 2/2006 | Montenegro | 713/181 |
| 2006/0039354 A1* | 2/2006 | Rao et al. | 370/352 |
| 2006/0039356 A1* | 2/2006 | Rao et al. | 370/352 |
| 2006/0048213 A1* | 3/2006 | Cheng et al. | 726/5 |
| 2006/0212701 A1 | 9/2006 | Warwick | |
| 2006/0274695 A1* | 12/2006 | Krishnamurthi et al. | 370/331 |
| 2007/0006291 A1* | 1/2007 | Barari et al. | 726/10 |
| 2007/0074022 A1* | 3/2007 | Wang et al. | 713/169 |
| 2007/0091345 A1* | 4/2007 | Qiu et al. | 358/1.14 |
| 2007/0143832 A1* | 6/2007 | Perrella et al. | 726/5 |
| 2007/0211681 A1* | 9/2007 | Sun et al. | 370/338 |
| 2007/0248050 A1* | 10/2007 | Metke et al. | 370/331 |
| 2008/0016333 A1* | 1/2008 | Cao et al. | 713/155 |
| 2008/0028225 A1 | 1/2008 | Eckert et al. | |
| 2008/0260147 A1* | 10/2008 | Shin et al. | 380/46 |
| 2008/0271117 A1* | 10/2008 | Hamilton et al. | 726/3 |
| 2009/0031406 A1* | 1/2009 | Hirose | 726/7 |
| 2009/0055904 A1 | 2/2009 | Gomi et al. | |
| 2009/0063691 A1* | 3/2009 | Kalofonos et al. | 709/229 |
| 2009/0077645 A1* | 3/2009 | Kottahachchi | 726/9 |
| 2009/0204808 A1* | 8/2009 | Guo et al. | 713/155 |
| 2009/0271623 A1* | 10/2009 | Forsberg et al. | 713/168 |
| 2010/0005300 A1 | 1/2010 | Klotsche | |
| 2010/0024013 A1* | 1/2010 | Cheng et al. | 726/5 |
| 2010/0100953 A1* | 4/2010 | Mowers et al. | 726/10 |
| 2010/0205441 A1* | 8/2010 | Sandberg et al. | 713/170 |
| 2010/0251067 A1* | 9/2010 | Hughes et al. | 714/755 |
| 2010/0299529 A1* | 11/2010 | Fielder | 713/181 |
| 2010/0322163 A1* | 12/2010 | Bhalla et al. | 370/329 |
| 2011/0103589 A1* | 5/2011 | Tie et al. | 380/282 |
| 2011/0238862 A1* | 9/2011 | Chaturvedi et al. | 709/238 |
| 2011/0314281 A1* | 12/2011 | Fielder | 713/168 |
| 2011/0320802 A1* | 12/2011 | Wang et al. | 713/2 |
| 2012/0108166 A1* | 5/2012 | Hymel | 455/26.1 |
| 2012/0144197 A1* | 6/2012 | Chung et al. | 713/169 |
| 2012/0179912 A1* | 7/2012 | Sandberg et al. | 713/168 |
| 2012/0250863 A1* | 10/2012 | Bukshpun et al. | 380/278 |

OTHER PUBLICATIONS

Network Associates, Inc., An Introduction to Cryptography, Version 6.5.1, 1999, USA.

Baier et al., Microsoft, A Guide to Claims-based Identity and Access Control, 2010.

\* cited by examiner

FIG. 3B

FIRST COMPUTING DEVICE

1ST SECRET DATA: authenticate to 2ND device
2ND SECRET DATA: authenticate to 3RD device
1ST ID DATA: authenticate to 2ND device
2ND ID DATA: authenticate to 3RD device 1ST HASH VALUE: Challenge + 1ST Secret Data
2ND HASH VALUE: Challenge + 2ND Secret Data
3RD HASH VALUE: Challenge + 1ST ID Data
4TH HASH VALUE: Challenge + 2ND ID Data
5TH HASH VALUE: 2ND Challenge + 1ST Secret Data
6TH HASH VALUE: 2ND Challenge + 2ND Secret Data

SECOND COMPUTING DEVICE

CHALLENGE
------
LOCAL SECRET DATA
LOCAL ID DATA
------
LOCAL HASH VALUE:
 Challenge + Local Secret Data
2ND LOCAL HASH VALUE:
 Challenge + Local ID Data

THIRD COMPUTING DEVICE

2ND CHALLENGE
------
2ND LOCAL SECRET DATA
------
3RD LOCAL HASH VALUE:
 2ND Challenge + 2ND Local Secret Data

FIG. 7

| DEVICE NAME (701) | DEVICE ADDRESS (702) | |
|---|---|---|
| Device 1 | Address 1 | 703 |
| Device 2 | Address 2 | 704 |
| Device 3 | Address 3 | 705 |
| Device 4 | Address 4 | 706 |
| Device 5 | Address 5 | 707 |

FIG. 8

| USERNAME (801) | PASSWORD (802) | |
|---|---|---|
| Username 1 | Password 1 | 803 |
| Username 2 | Password 2 | 804 |
| Username 3 | Password 3 | 805 |
| Username 4 | Password 4 | 806 |

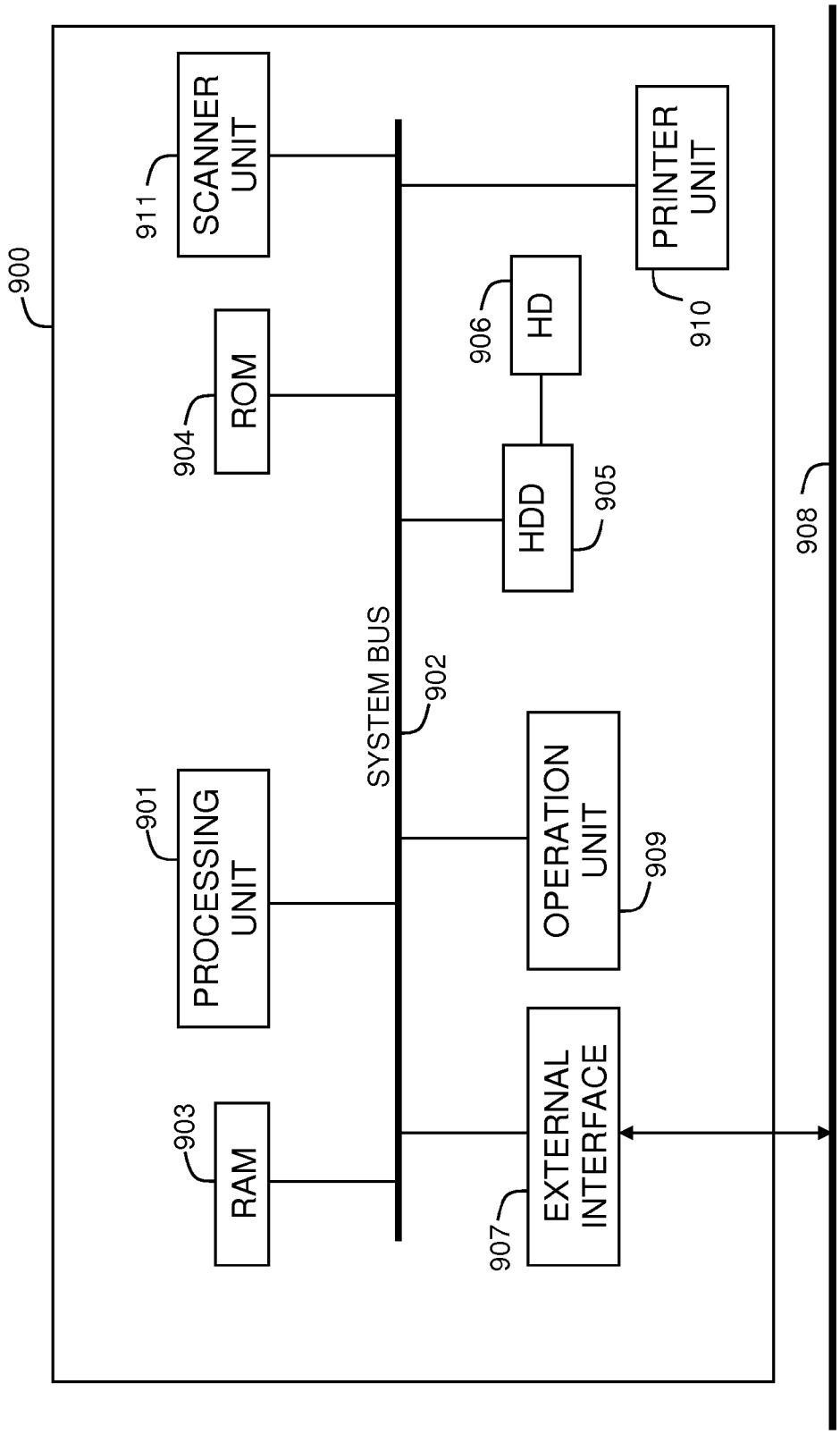

METHOD, SYSTEM, AND COMPUTER-READABLE STORAGE MEDIUM FOR AUTHENTICATING A COMPUTING DEVICE

BACKGROUND OF THE INVENTION

1. Field of the Invention

The present invention relates generally to authentication, and more particularly to a method, system, and computer-readable storage medium for authenticating a computing device.

2. Description of the Related Art

Computing systems and devices, as well as computer networks, are ubiquitous in modern society. Computing systems and devices take a variety of forms including desktop computers, laptop computers, multifunction peripherals (MFPs), Personal Digital Assistants (PDAs), tablet PCs, household devices, and the like. Computer networks enable computing devices to communicate with other computing devices and access information. However, by connecting to a computer network, a connected computing device can also potentially be open to security breaches. For example, another computing device may make a false claim about its identity in order to access information or a resource. Authenticating such a computing device helps guard against this type of security breach.

A first entity, such as a computing device, a user of a computing device, or an application, can be authenticated to a second entity in a variety of ways. For example, the first entity may authenticate to the second entity by providing secret data, such as a password, by use of a smart card, or by providing biometric information. These and/or other authentication factors may be used alone or in combination to authenticate the first entity to the second entity.

Authentication schemes are utilized in a variety of contexts. For example, a client may be required to authenticate to a server before the client is permitted to access a resource on the server. Further by way of example, a first peer may be required to authenticate to a second peer before the first peer is permitted to provide information to or obtain information from the second peer.

In the context of peer-to-peer communications, a peer may be authorized to distribute configuration information to other peers. The peer sending the configuration information is referred to as a source peer and the peers to whom the configuration information is sent are referred to as target peers. For purposes of authentication, a user or administrator provides to the source peer the following information for each and every target peer: a username, a password, and an indication of the target peer to which the username and password correspond. Before the source peer is permitted to send the configuration information to the target peers, the source peer is authenticated to the target peers. The source peer provides a username and password to each of the target peers. For each target peer, if the username and password from the source peer matches the configuration username and password of the target peer, the source peer is authenticated to the target peer. The username of each target peer may be the same as or different than the respective usernames of the other target peers. Additionally, the password of each target peer may be the same as or different than the respective passwords of the other target peers.

In the above-described conventional process for authenticating a source peer, the user or administrator is required to provide information specifying the target device to which each username and password pair corresponds. Additionally, the user or administrator is required to provide a username and password pair for each and every target device even if the same username and password pair was already provided for a different target device.

What is more, in a case that the username and password from the source peer does not match the configuration username and password of the target peer, the target peer communicates to the source peer that the authentication has failed. In response, the source peer may try again to authenticate to the target peer by providing a different username and password pair. Thus, when a try-fail-try sequence such as described above is used to authenticate a source peer, additional communications over the network are required relative to a case in which the initial authentication attempt is successful. These additional communications can increase usage of network resources and slow down the authentication process.

Similarly, in the client-server context, when a try-fail-retry sequence is used to authenticate a client, additional communications over the network are required relative to a case in which an initial authentication attempt is successful. These additional communications can increase usage of network resources and slow down the authentication process.

SUMMARY OF THE INVENTION

Embodiments of the present invention address the various problems described above by providing methods and systems for authenticating a computing device.

Embodiments of the invention include generating at a first computing device a message using first secret data and second secret data, the first secret data for authenticating to a second computing device, the second secret data for authenticating to a third computing device. The first computing device then sends the generated message to the second computing device. In some embodiments, challenge-response authentication is implemented. For example, the first computing device receives a challenge from the second computing device and generates the message based at least in part on the challenge.

According to embodiments of the invention, the second computing device receives the message from the first computing device. Thus, the message received at the second computing device may include information for authenticating to one or more other computing devices, such as the third computing device, in addition to information for authenticating to the second computing device. For example, the message may comprise first information and second information, the first information comprising or corresponding to the first secret data, the second information comprising or corresponding to the second secret data. After receiving the message, the second computing device then compares local information with the received information. Based on comparing the local information with the second information, the second computing device determines that the local information does not match the second information. Based on comparing the local information with the first information, the second computing device determines that the first computing device is authenticated to the second computing device based on the local information matching the first information. Furthermore, the first computing device can be authenticated to the third computing device by a similar process.

Furthermore, embodiments of the invention include one or more computing devices that implement processes described herein. The one or more computing devices each include a processor, a memory, and a network interface. Embodiments of the invention provide a computing device including a generating unit configured to generate a message using first secret data and second secret data, the first secret data for authenticating to a second computing device, the second secret data for authenticating to a third computing device, and a sending unit configured to send the message to the second computing device.

Still further, embodiments of the invention provide a computing device including a receiving unit configured to receive a message from a first computing device, the message comprising first information and second information, a comparing unit configured to compare local information with the first information, and to compare the local information with the second information, and a determining unit configured to determine, based on a result of the comparing unit, that the first computing device is authenticated in a case that the local information matches one of the first information and the second information.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 illustrates a data structure used to store target device information according to embodiments of the present invention.

FIG. 8 illustrates a data structure used to store credential information according to embodiments of the present invention.

FIG. 9 illustrates an example of a hardware configuration of a multifunction peripheral (MFP) according to embodiments of the present invention.

DESCRIPTION OF THE EMBODIMENTS

Embodiments of the present invention are described with reference to the drawings.

Figure 1:
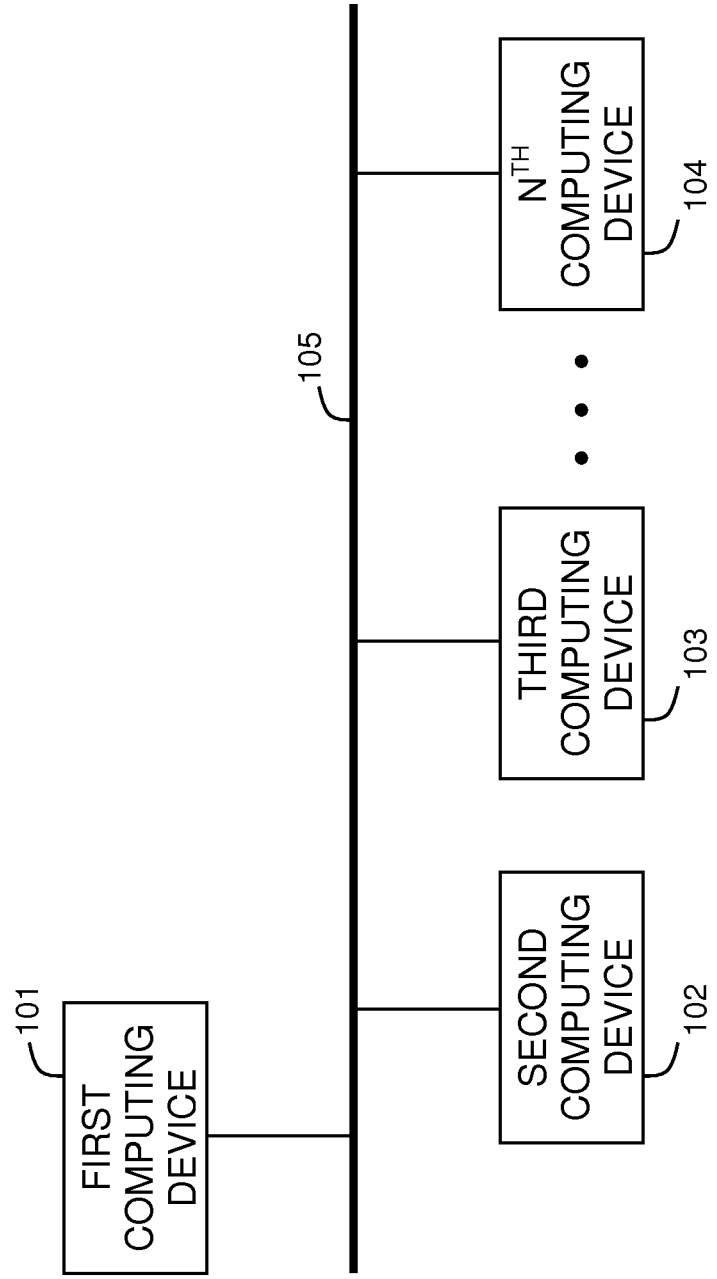
FIG. 1 illustrates an example of a computer network.

FIG. 1 illustrates a plurality of computing devices 101-104 connected to a computer network 105 (also referred to herein simply as a network). The plurality of computing devices 101-104 may be the same type of computing device or may be different types of computing devices. By way of example, the plurality of computing devices 101-104 may be a PC, a server, a client, a peer device or other common network node. The Nth computing device 104 represents that more computing devices than illustrated at FIG. 1 may be connected to the computer network 105.

The computer network 105 facilitates communications between the plurality of computing devices 101-104. The computer network 105 is any type of computer network consistent with the teachings of the present invention. For example, the computer network 105 may comprise a local area network (LAN), wide area network (WAN), or a combination of networks.

In FIG. 1, the first computing device 101 must be authenticated to the other computing devices 102-104 before the first computing device 101 is permitted to access the other computing devices 102-104.

Figure 2:
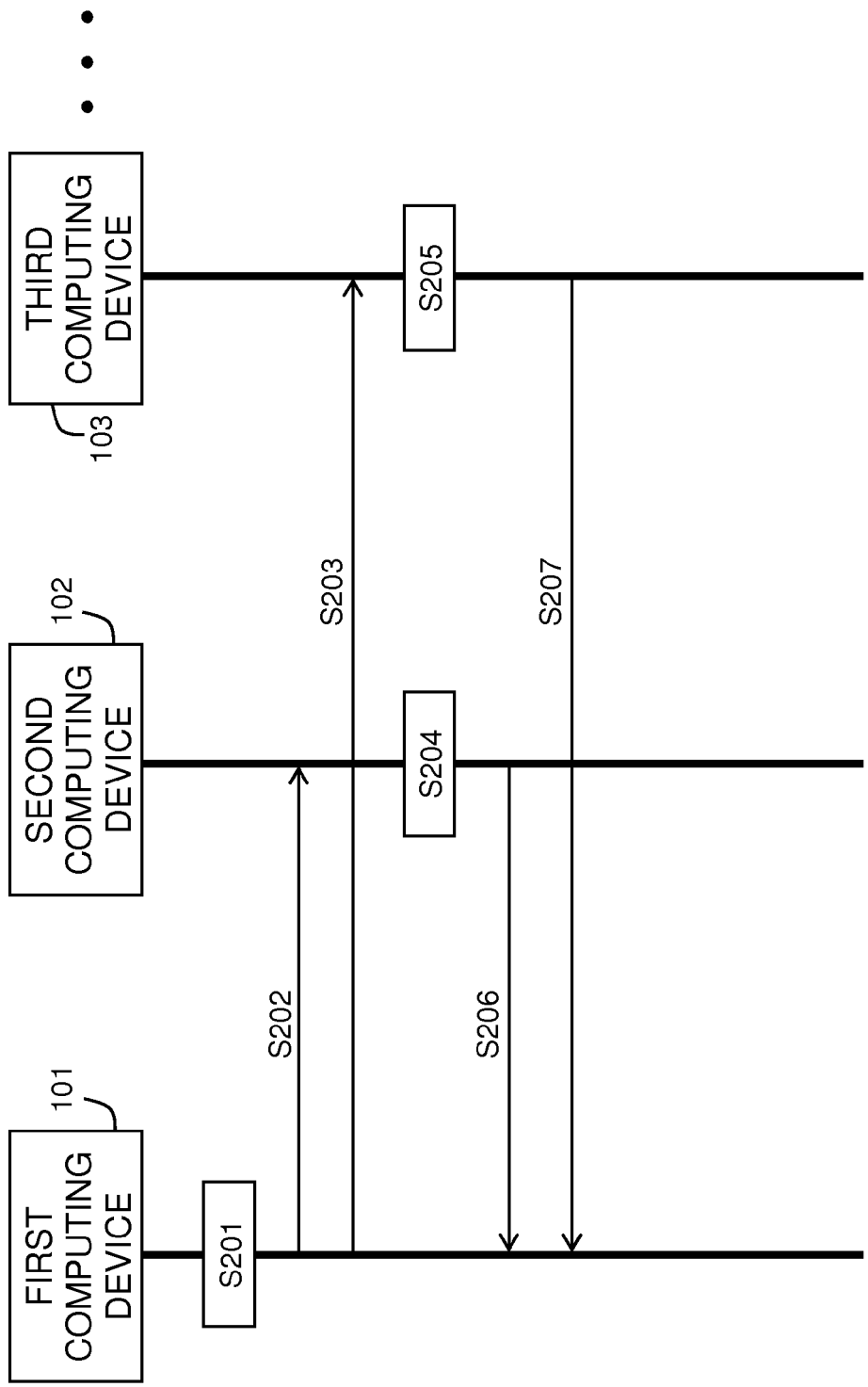
FIG. 2 illustrates operations of and communications between computing devices according to embodiments of the present invention.

FIG. 2 illustrates operations of and communications between the first computing device 101 and the second computing device 102, and also between the first computing device 101 and the third computing device 103. The operations and communications described with respect to FIG. 2 are representative of operations of and communications between the first computing device 101 and each one of the other computing devices 102-104 connected to the computer network 105.

At step S201, the first computing device 101 generates a message that includes first secret data and second secret data. The first secret data and the second secret data are, for example, passwords. The first secret data is for authenticating to the second computing device 102. The second secret data is for authenticating to the third computing device 103. In order to generate the message, the first computing device 101 may retrieve the first secret data and the second secret data from memory of the first computing device 101. By way of example, the secret data may previously have been received at the first computing device 101 by a user input and stored in memory. After the first secret data and the second secret data are retrieved, the first computing device 101 generates a plaintext message including the first secret data and the second secret data. As described below with respect to step S202, when the message is generated in plaintext, a secure connection is used for communications.

In some embodiments, the message generated at step S201 further includes first identification data paired with the first secret data, and second identification data paired with the second secret data. The first identification data and the second identification data are, for example, usernames. The first identification data is for use in conjunction with the first secret data for authenticating to the second computing device 102. The second identification data is for use in conjunction with the second secret data for authenticating to the third computing device 103. The first identification data and the second identification data are received, stored and retrieved in the same manner as the first secret data and the second secret data. After the first identification data and the second identification data are retrieved, the first computing device 101 generates a plaintext message including the first secret data paired with the first identification data, and the second secret data paired with the second identification data.

In the above-described manner, the first computing device 101 generates a message to be sent to the second computing device 102, and generates a message to be sent to the third computing device 103. Before sending the messages, the first computing device 101 retrieves the address of the second computing device 102 and the third computing device 103 from, for example, a hard disk of the first computing device 101. By way of example, the addresses may previously have been received at the first computing device 101 by a user input and stored in the hard disk.

At step S202, the first computing device 101 sends the generated message to the second computing device 102. According to the instant embodiment, the message is sent using a secure line. For example, the message is sent using a Transport Layer Security (TLS) or Secure Sockets Layer (SSL) connection. Thus, the secrecy of the data can be maintained even when the message is generated in plaintext.

Next, at step S203, the first computing device 101 sends the generated message to the third computing device 103. Just as the message to the second computing device 102 was sent using a secure line, the message to the third computing device 103 is also sent using a secure line.

According to the instant embodiment, both the second computing device 102 and the third computing device 103 receive a message that includes the first secret data and the second secret data.

At step S204, the second computing device 102 compares local secret data with the data received from the first computing device 101 in order to authenticate the first computing device 101. The local secret data is, for example, a password. The local secret data is for authenticating to the second computing device 102. The second computing device 102 stores and maintains the local secret data in, for example, a hard disk of the second computing device 102. The second computing device 102 retrieves the local secret data from the hard disk and compares the local secret data to the data received from the first computing device 101. For example, the second computing device 102 compares the local secret data with the second secret data. As described above with respect to S201, the second secret data is for authenticating to the third computing device 103. Based on the comparing the local secret data with the second secret data, the second computing device 102 determines the local secret data does not match the second secret data.

Next, the second computing device 102 compares the local secret data with the first secret data. As described above with respect to S201, the first secret data is for authenticating to the second computing device 102. Thus, based on the comparing the local secret data with the first secret data, the second computing device 102 determines the first computing device 101 is authenticated to the second computing device 102 based on the local secret data matching the first secret data.

During a period from the determining that the local secret data does not match the second secret data to the comparing the local secret data with the first secret data, the second computing device 102 does not send a message indicating the local secret data does not match the second secret data.

In some embodiments, step S204 further includes comparing local identification data with identification data received from the first computing device 101. The local identification data is paired with the local secret data. The local identification data is, for example, a username. The local identification data is for use in conjunction with the local secret data for authenticating to the second computing device 102. The second computing device 102 stores, maintains and retrieves the local identification data in the same manner as the local secret data.

Accordingly, at step S204, the second computing device 102 compares the local secret data with the second secret data, as described above, and compares local identification data with the second identification data. Based on the comparing, the second computing device 102 determines the local secret data does not match the second secret data, and the local identification data does not match the second identification data. Next, the second computing device 102 compares the local secret data with the first secret data, as described above, and compares the local identification data with the first identification data. Based on the comparing, the second computing device 102 determines the first computing device 101 is authenticated to the second computing device 102 based on the local secret data matching the first secret data and the local identification data matching the first identification data. According to this embodiment, both the local secret data and the local identification data must match for authentication.

At step S205, the third computing device 103 executes operations similar to those described with respect to the second computing device 102 at step S204. However, at step S205, the first computing device 101 is authenticated to the third computing device 103 based on the second secret data instead of the first secret data.

At step S206, the second computing device 102 sends the first computing device 101 a message indicating the first computing device 101 is authenticated to the second computing device 102. This communication may include one or a combination of the following: the matched secret data, the matched secret data and identification data, the matched identification data, an authentication success message, a grant of access to the second computing device 102, receipt of information from the second computing device 102, or other similar response.

Step S207 is similar to step S206 except that the message is sent from and may relate to the third computing device 103 instead of the second computing device 102.

Figure 3:
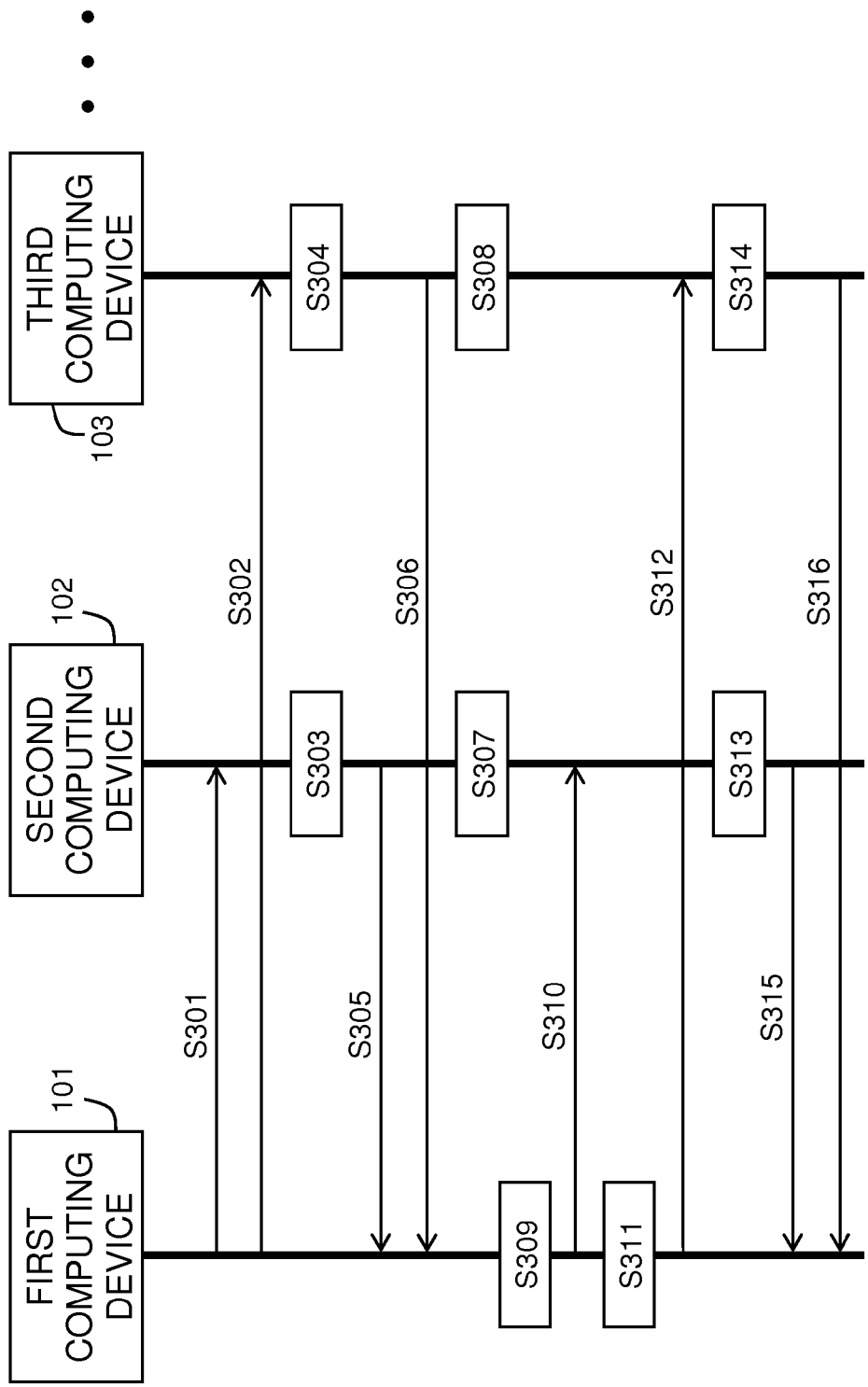
FIG. 3A illustrates operations of and communications between computing devices according to embodiments of the present invention.
FIG. 3B is for reference in conjunction with FIG. 3A and the corresponding description.

Turning to FIG. 3A, a challenge-response mechanism is used for authentication according to embodiments of the invention.

FIG. 3A illustrates operations of and communications between the first computing device 101 and the second computing device 102, and also between the first computing device 101 and the third computing device 103. The operations and communications described with respect to FIG. 3A are representative of operations of and communications between the first computing device 101 and each one of the other computing devices 102-104 connected to the computer network 105. FIG. 3B is for reference in conjunction with FIG. 3A and the corresponding description. Various interrelated data elements are described with reference to FIG. 3A. FIG. 3B provides a list of some of these data elements, including in some cases an indication of the relationship between data elements and/or devices according to some embodiments of the invention. For clarity, data elements shown at FIG. 3B are grouped according to the devices primarily correlated therewith. FIG. 3B does not illustrate a data structure, network configuration, hardware or software configuration, or a particular embodiment of the invention. Embodiments of the invention may or may not include or utilize one or more individual data elements, devices, or configurations thereof, shown at FIG. 3B. FIG. 3B is not intended to provide definitions of words or phrases appearing in the claims, drawings, or written description.

With reference to FIG. 3A, at step S301, the first computing device 101 sends an access request to the second computing device 102. At step S302, the first computing device 101 sends an access request to the third computing device 103. The access requests are messages requesting access to the second computing device 102 and the third computing device 103, respectively. Before sending the messages, the first computing device 101 retrieves the address of the second computing device 102 and the third computing device 103 from, for example, a hard disk of the first computing device 101. By way of example, the addresses may previously have been received at the first computing device 101 by a user input and stored in the hard disk.

At step S303, the second computing device 102 generates a challenge. At step S304, the third computing device 103 generates a second challenge. The challenge and the second challenge may be a random number and a second random number, respectively.

At step S305, the second computing device 102 sends the challenge to the first computing device 101. At step S306, the third computing device 103 sends the second challenge to the first computing device 101. In addition to the challenge and the second challenge, the second computing device 102 and/or the third computing device 103, respectively, may send other information such as a session identifier to the first computing device 101.

At step S307, the second computing device 102 generates a local hash value by applying a one-way function to the challenge and local secret data. The local secret data is, for example, a password. The local secret data is for authenticating to the second computing device 102. The second computing device 102 retrieves the local secret data from, for example, a hard disk of the second computing device 102.

After the local secret data is retrieved, the second computing device 102 generates the local hash value. The one-way function may be a type of hash function, and the challenge may be a random number. The second computing device 102 applies the hash function to the random number and the local secret data to generate the local hash value. The second computing device 102 can later use the local hash value for authentication by comparing the local hash value to corresponding challenge response values.

In some embodiments of step S307, in addition to generating the local hash value, the second computing device 102 further generates a second local hash value by applying a one-way function to the challenge and local identification data. The local identification data is paired with the local secret data. The local identification data is, for example, a username. The local identification data is for use in conjunction with the local secret data for authenticating to the second computing device 102. The second computing device 102 retrieves the local identification data from, for example, a hard disk of the second computing device 102.

After the local identification data is retrieved, the second computing device 102 generates the second local hash value. The one-way function may be a type of hash function, and the challenge may be a random number. The second computing device 102 applies the hash function to the random number and the local identification data to generate the second local hash value. The second computing device 102 can later use the second local hash value for authentication by comparing the second local hash value to corresponding challenge response values.

At step S308, the third computing device 103 generates a third local hash value by applying a one-way function to the second challenge and second local secret data. The second local secret data is, for example, a password. The second local secret data is for authenticating to the third computing device 103. The third computing device 103 retrieves the second local secret data from, for example, a hard disk of the third computing device 103.

After the second local secret data is retrieved, the third computing device 103 generates the third local hash value. The one-way function may be a type of hash function, and the second challenge may be a second random number. The third computing device 103 applies the hash function to the second random number and the second local secret data to generate the third local hash value. The third computing device 103 can later use the third local hash value for authentication by comparing the third local hash value to corresponding challenge response values.

At step S309, the first computing device 101 generates a response to the challenge. The response includes a first hash value and a second hash value, the first hash value corresponding to first secret data for authenticating to the second computing device 102, the second hash value corresponding to second secret data for authenticating to the third computing device 103. The first secret data and the second secret data are, for example, passwords.

The first computing device 101 generates the first hash value by applying a one-way function to the challenge and the first secret data. The first computing device 101 generates the second hash value by applying the one-way function to the challenge and the second secret data. The first computing device 101 may retrieve the first secret data and the second secret data from memory of the first computing device 101. By way of example, the secret data may previously have been received at the first computing device 101 by a user input and stored in memory. After the first secret data and the second secret data are retrieved, the first computing device 101 generates the first hash value and the second hash value. The one-way function may be a type of hash function, and the challenge may be a random number. The first computing device 101 applies the hash function to the random number and the first secret data to generate the first hash value. The first computing device 101 applies the hash function to the random number and the second secret data to generate the second hash value.

In some embodiments, the response generated at step S309 further includes a third hash value and a fourth hash value, the third hash value corresponding to first identification data paired with the first secret data, the fourth hash value corresponding to second identification data paired with the second secret data. The first identification data and the second identification data are, for example, usernames. The first identification data is for use in conjunction with the first secret data for authenticating to the second computing device 102. The second identification data is for use in conjunction with the second secret data for authenticating to the third computing device 103.

The first computing device 101 generates the third hash value by applying the one-way function to the challenge and the first identification data. The first computing device 101 generates the fourth hash value by applying the one-way function to the challenge and the second identification data. The first identification data and the second identification data are received, stored and retrieved in the same manner as the first secret data and the second secret data. After the first identification data and the second identification data are retrieved, the first computing device 101 generates the third hash value and the fourth hash value. The one-way function may be a type of hash function, and the challenge may be a random number. The first computing device 101 applies the hash function to the random number and the first identification data to generate the third hash value. The first computing device 101 applies the hash function to the random number and the second identification data to generate the fourth hash value.

At step S310, the first computing device 101 sends the response generated at step S309 to the second computing device 102.

At step S311, the first computing device 101 generates a response to the second challenge. The response includes a fifth hash value and a sixth hash value, the fifth hash value corresponding to the first secret data, the sixth hash value corresponding to second secret data.

The first computing device 101 generates the fifth hash value by applying a one-way function to the second challenge and the first secret data. The first computing device 101 generates the sixth hash value by applying the one-way function to the second challenge and the second secret data. As discussed above at step S309, the first computing device 101 may retrieve the first secret data and the second secret data from memory of the first computing device 101. After the first secret data and the second secret data are retrieved, the first computing device 101 generates the fifth hash value and the sixth hash value. The one-way function may be a type of hash function, and the second challenge may be a second random number. The first computing device 101 applies the hash function to the second random number and the first secret data to generate the fifth hash value. The first computing device 101 applies the hash function to the second random number and the second secret data to generate the sixth hash value.

At step S312, the first computing device 101 sends the response generated at step S311 to the third computing device 103.

At step S313, the second computing device 102 compares the local hash value with the data received from the first computing device 101 in step S310 in order to authenticate the first computing device 101. For example, the second computing device 102 compares the local hash value with the second hash value. The second hash value corresponds to the second secret data. As described above with respect to S309, the second secret data is for authenticating to the third computing device 103. Based on the comparing the local hash value with the second hash value, the second computing device 102 determines the local hash value does not match the second hash value.

Next, the second computing device 102 compares the local hash value with the first hash value. The first hash value corresponds to the first secret data. As described above with respect to S309, the first secret data is for authenticating to the second computing device 102. Thus, based on the comparing the local hash value with the first hash value, the second computing device 102 determines the first computing device 101 is authenticated to the second computing device 102 based on the local hash value matching the first hash value.

During a period from the determining that the local hash value does not match the second hash value to the comparing the local hash value with the first hash value, the second computing device 102 does not send a message indicating the local hash value does not match the second hash value.

In some embodiments, step S313 further includes comparing the second local hash value with the third hash value and the fourth hash value received from the first computing device 101 in step S310.

Accordingly, at step S313, the second computing device 102 compares the local hash value with the second hash value, as described above, and compares the second local hash value with the fourth hash value. Based on the comparing, the second computing device 102 determines the local hash value does not match the second hash value, and the second local hash value does not match the fourth hash value. Next, the second computing device 102 compares the local hash value with the first hash value, as described above, and compares the second local hash value with the third hash value. Based on the comparing, the second computing device 102 determines the first computing device 101 is authenticated to the second computing device 102 based on the local hash value matching the first hash value and the second local hash value matching the third hash value. According to this embodiment, both the local hash value and the second local hash value must match for authentication.

At step S314, the third computing device 103 compares the third local hash value with the data received from the first computing device 101 in step S312 in order to authenticate the first computing device 101. For example, the third computing device 103 compares the third local hash value with the fifth hash value. The fifth hash value corresponds to the first secret data. As described above with respect to S309, the first secret data is for authenticating to the second computing device 102. Based on the comparing the third local hash value with the fifth hash value, the third computing device 103 determines the third local hash value does not match the fifth hash value.

Next, the third computing device 103 compares the third local hash value with the sixth hash value. The sixth hash value corresponds to the second secret data. As described above with respect to S309, the second secret data is for authenticating to the third computing device 102. Thus, based on the comparing the third local hash value with the sixth hash value, the third computing device 103 determines the first computing device 101 is authenticated to the third computing device 103 based on the third local hash value matching the sixth hash value.

During a period from the determining that the third local hash value does not match the fifth hash value to the comparing the third local hash value with the sixth hash value, the third computing device 103 does not send a message indicating the third local hash value does not match the fifth hash value.

At step S315, the second computing device 102 sends the first computing device 101 a message indicating the first computing device 101 is authenticated to the second computing device 102. This communication may include one or a combination of the following: the matched hashed secret data, the matched hashed secret data and hashed identification data, the matched hashed identification data, an authentication success message, a grant of access to the second computing device 102, receipt of information from the second computing device 102, or other similar response.

Step S316 is similar to step S315 except that the message is sent from and may relate to the third computing device 103 instead of the second computing device 102.

Figure 4:
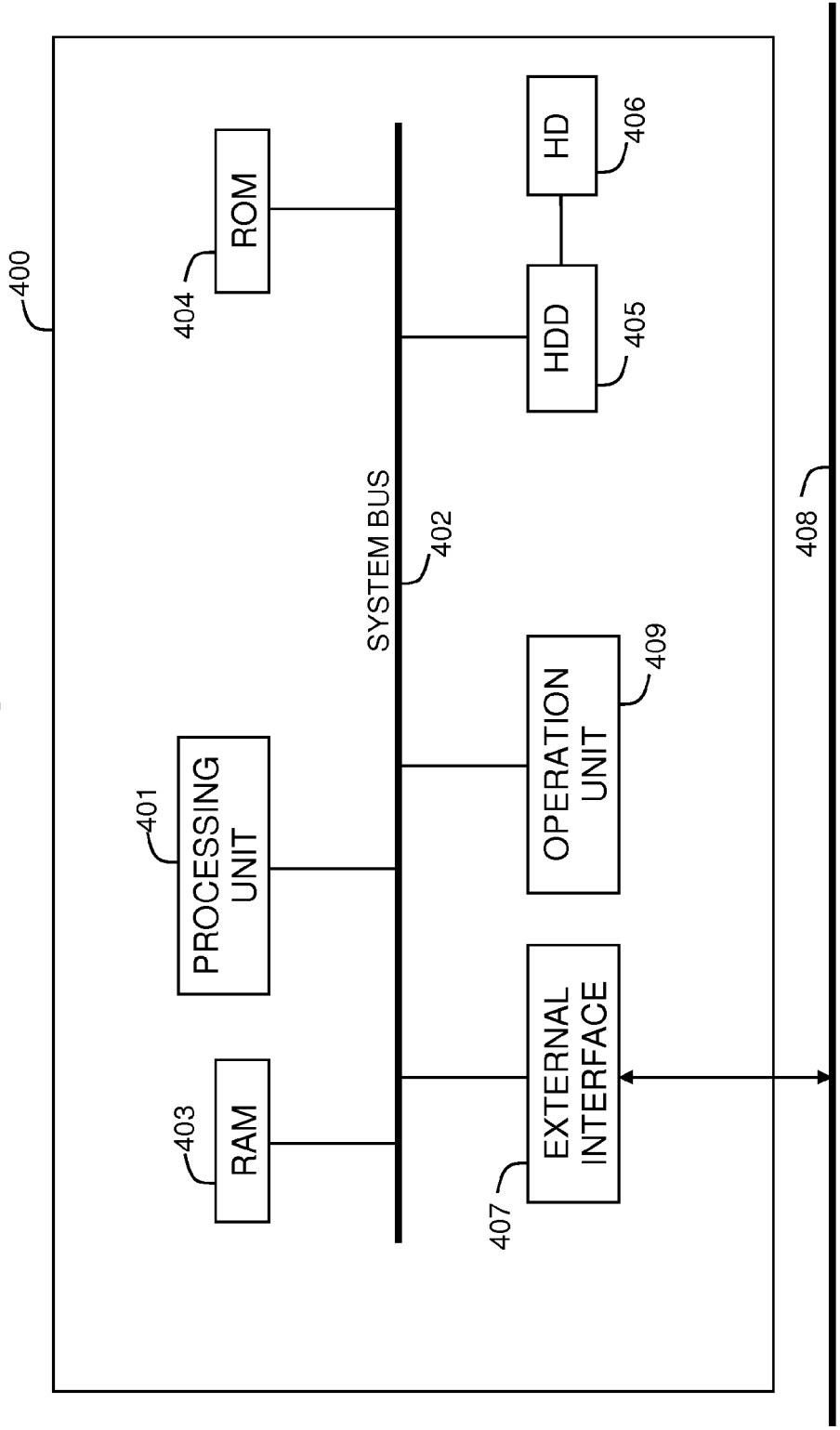
FIG. 4 illustrates an example of a hardware configuration of a computing device according to embodiments of the present invention.

FIG. 4 illustrates an example of a hardware configuration of a computing device 400 according to embodiments of the present invention. The plurality of computing devices 101-103 which execute various processes of the invention may be configured in the same or a similar manner as the computing device 400 of FIG. 4.

The computing device 400 includes a processing unit 401, system bus 402, random access memory (RAM) 403, read only memory (ROM) 404, hard disk drive (HDD) 405, hard disk (HD) 406, and an external interface 407 operable to connect the computing device 400 to a network 408. The computing device 400 may be a general purpose computer, a client, a server, an MFP, or other type of computing device.

The processing unit 401 may comprise a single central-processing unit (CPU) or a plurality of processing units. The processing unit 401 executes various processes and controls the computing device 401 in accordance with various programs stored in memory. The processing unit 401 controls reading data and control signals into or out of memory. The processing unit 401 uses the RAM 403 as a work area and executes programs stored in the ROM 404.

The system bus 402 may be a local bus, for example, and may implement any of a variety of bus architectures.

The RAM 403 is used as a work area when various programs stored in the ROM 404 are executed, a temporary save area for various data, and a work area during execution of various processes.

The ROM 404 stores data and programs having computer-executable instructions for execution by the processing unit 401. The ROM 404 stores programs configured to cause the computing device 400 to execute operations and processes described herein, according to various embodiments.

According to embodiments of the invention described above, the first computing device 101 stores various data elements in memory which includes ROM 404 and RAM 403. For example, the first computing device 101 may store the first secret data, the second secret data, the first identification data, and/or the second identification data in memory. Still further, when executing challenge-response authentication according to embodiments of the invention, the first computing device 101 may further store various hash values in the memory.

The HDD 405 reads from and writes to the hard disk 406, which may store application data, program modules or other information. According to embodiments of the invention, the plurality of computing devices 101-103 which execute various processes of the invention store programs or program modules configured to execute operations and processes described herein.

Additionally, the computing device 400 may include other storage media, such as non-volatile flash memory, removable memory, such as a compact disk (CD), digital versatile disk (DVD), a CD-ROM, memory card, magneto-optical disk or any combination thereof. All or a portion of a computer-readable storage medium of the computing device 400 may be in the form of one or more removable blocks, modules, or chips. The computer-readable storage medium need not be one physical memory device, but can include one or more separate memory devices.

The external interface 407 connects the computing device 400 to external devices and networks and performs network communications. In FIG. 4, the external interface 407 connects the computing device 400 to the network 408.

The operation unit 409 allows for user operations and inputs into the computing device 400. The operation unit 409 may include a variety of interfaces for connecting input devices, such as a keyboard, pointing device, or the like. The operation unit 409 may also be integrated with the computing device 400, such as a touch screen or a panel with buttons.

FIGS. 1-4 illustrate principles of the present invention generally. Turning now to FIGS. 5-9, embodiments of the invention are described in the context of peer authentication for peer to peer configuration distribution.

Figure 5:
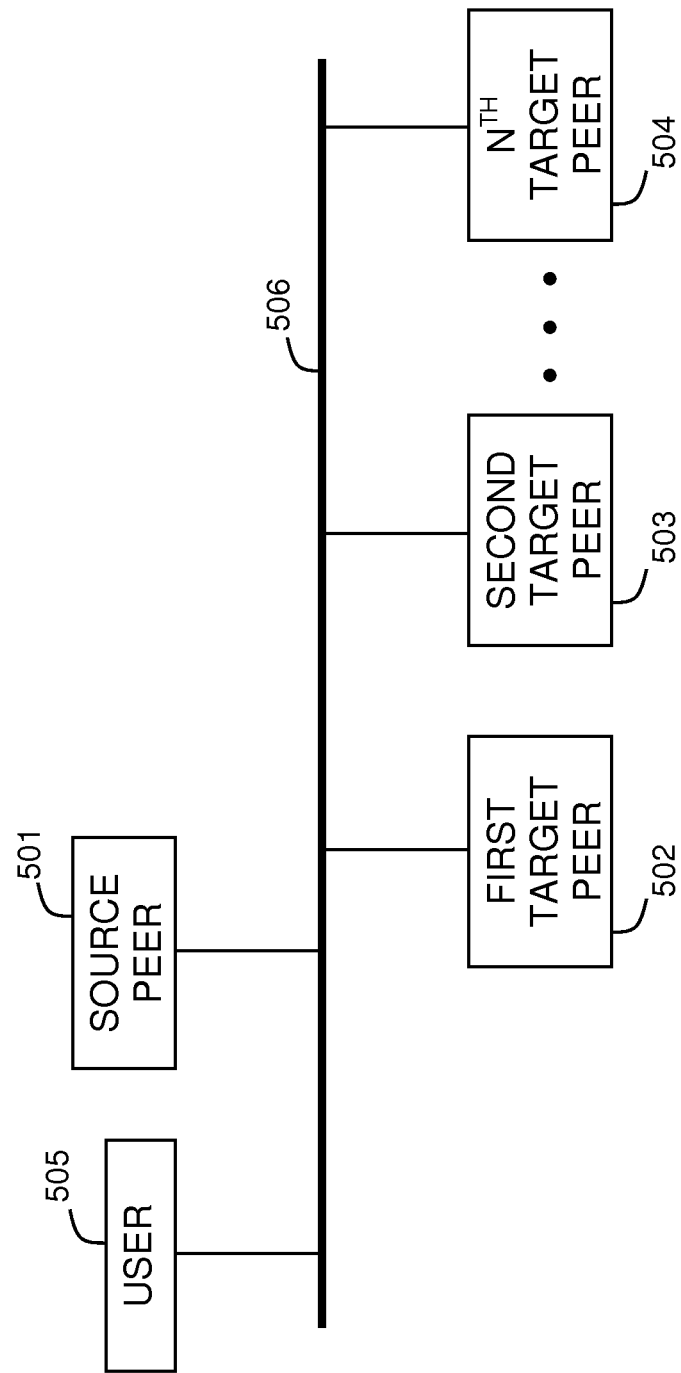
FIG. 5 illustrates an example of a computer network including a source peer and a plurality of target peers.

FIG. 5 illustrates a plurality of computing devices 501-505 connected to a computer network 506 (also referred to herein simply as a network). Computing devices 501-504 are MFPs connected via a network such as a LAN, a CAN (campus network), or the like, in which a network administrator maintains devices on the network. Computing device 501 comprises a source peer 501. The source peer 501 provides configuration information to the target peers. The recipients of the configuration information are the target peers. In this case, the network includes a first target peer 502, a second target peer 503, and the Nth target peer 504. The Nth target peer 504 represents that more target peers than illustrated at FIG. 5 may be connected to the computer network 506. The computing device 505 comprises a user or network administrator who maintains the network by updating software and hardware components, monitoring security and performing other network-related tasks.

Figure 6:
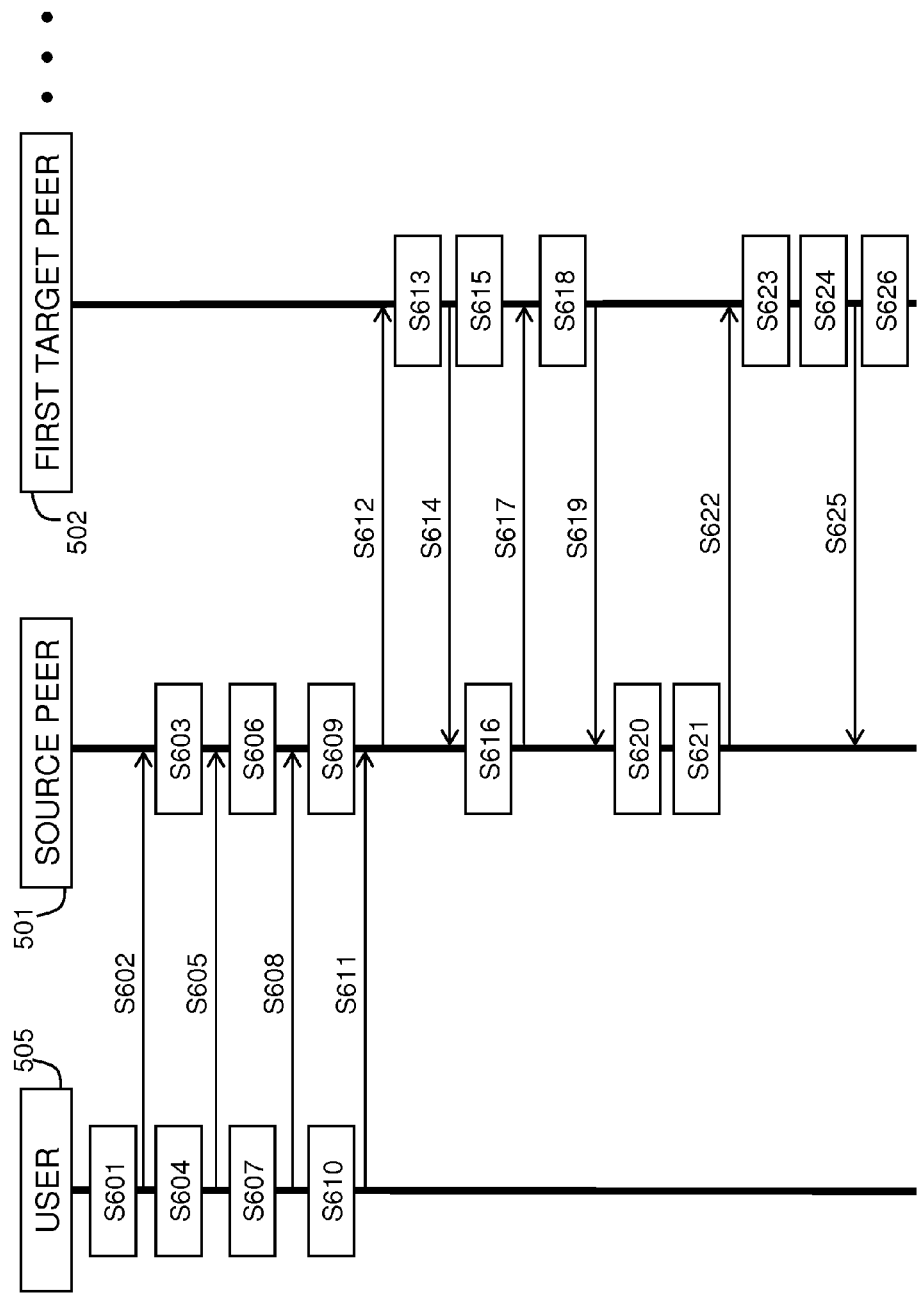
FIG. 6 illustrates operations of and communications between computing devices according to embodiments of the present invention.

FIG. 6 illustrates operations of and communications between the user 505 and the source peer 501, and also between the source peer 501 and the first target peer 502. Operations of and communications between the source peer 501 and the first target peer 502 are representative of operations of and communications between the source peer 501 and each one of the target peers 502-504 connected to the computer network 506. Also, FIG. 6 illustrates principles of the invention in the context of peer authentication for peer to peer configuration distribution.

At steps S601 to S603, the source peer is pre-configured. At step S601, the user 505 prepares configuration information. The configuration information comprises application data to configure the peers 501-504 on the computer network 506. At step S602, the user 505 sends the configuration information to the source peer 501 to configure the source peer 501. At step S603, the source peer 501 stores the configuration information in the hard disk of the source peer 501.

At step S604, the user 505 generates a target device list (TDL). The TDL is a list of peer devices to which configuration information may be sent. For each peer device on the TDL, the following device information is provided: a Device Name and a Device Address. The device information may be uploaded from a file. Alternatively, the user 505 or administrator may input device information using a web browser on a PC, for example.

At step S605, the user 505 sends the TDL to the source peer 501. Then, at step S606, the source peer 501 stores the TDL to the hard disk of the source peer 501. FIG. 7 is a data structure representation of a TDL stored at the source peer 501, where target device information 703-707 for respective target devices includes a device name 701 and a device address 702.

At step S607, the user 505 or administrator generates a username and password list (UPL). The UPL is a list of credentials to authenticate the target devices listed on the TDL. More specifically, the UPL includes a Username and Password entry for the target devices. The entries on the UPL are not linked to a particular target device. Rather, username and password pairs are simply accumulated by the user 505 without an indication of the target device to which it corresponds. The user 505 generates the UPL by manual entry of information using a web browser on a PC, for example. In some embodiments, passwords are provided but usernames are not provided. For example, target devices may share the same username but have different passwords, such that username information need not be sent to the source peer 501.

At step S608, the user 505 or administrator sends the UPL to the source peer 501. Then, at step S609, the source peer 501 stores the UPL in the memory of the source peer 501. FIG. 8 is a data structure representation of a UPL stored at the source peer 501, where credentials 803-806 for target devices include a username 801 and a password 802.

Although the above steps indicate the TDL is generated and sent before the UPL is generated and sent, the steps S604/605 and S607/608 may permissibly be executed in either order.

At step S610, the user 505 selects which of the target devices the configuration information should be sent to. For example, the user 505 may select all target devices on the TDL, or only a portion of the target devices on the TDL. After selecting the target devices to which the configuration information will be sent, the process proceeds to step S611.

At step S611, the user 505 or administrator sends a distribute command to the source peer 501. The distribute command includes command information instructing the distribution of all or a portion of the configuration information stored at the source peer 501 to the target devices selected at step S610.

Before the source peer 501 can distribute the configuration information to the target devices in accordance with the distribute command, the source peer 501 must authenticate to the target devices. Thus, an authentication process such as described with respect to, for example, FIG. 2 or FIG. 3A is executed after step S611. In FIG. 6, steps S612 to S619 illustrate an authentication process that is similar to the authentication process described with respect to FIG. 3A. However, an authentication process similar to that described with respect to FIG. 2 could also be executed after step S611.

In step S612, the source peer 501 sends an access request to the first target peer 502 in a manner described with respect to step S301.

At step S613, the first target peer 502 generates a challenge and, at step S614, the first target peer 502 sends the challenge to the source peer 501 in a manner described with respect to steps S303 and S305, respectively.

At step S615, the first target peer 502 generates two local hash values in a manner described with respect to step S307. The first target peer 502 generates a local hash value based on the challenge and a password of the first target peer 502; and the first target peer 502 generates a second local hash value based on the challenge and a username of the first target peer 502.

At step S616, the source peer 501 generates a response to the challenge in a manner described with respect to step S309. The response comprises a hashed UPL. Each password on the UPL is hashed and each username on the UPL is hashed. For example, the first hash value and the third hash value of step S309 correspond to a hashed password from the UPL and the corresponding hashed username from the UPL. For each username-password pair on the UPL, a hashed username and a hashed password are generated and paired by the source peer 501. The source peer 501 stores the hashed UPL in the memory of the source peer 501.

At step S617, the source peer 501 sends the response generated at step S616 to the first target peer 502 in a manner described with respect to step S310.

At step S618, the first target peer 502 compares the local hash values generated at step S615 with the hashed UPL generated at step S616 in a manner described with respect to step S313. For example, the first target peer 502 compares the local hash value based on the password of the first target peer 502 and the second local hash value based on the username of the first target peer 502 with the hashed username-password pairs on the hashed UPL received in step S617. The first target peer 502 continues checking the local hashed values against the hashed username-password pairs on the hashed UPL until a match is identified.

According to such a process, the user 505 is not required to provide information specifying the target device to which each username and password pair corresponds since the list of credentials or hashed credentials is checked by each of the target peers until a match is identified.

Additionally, in cases where credential information is the same for multiple target devices, the credential information need not be duplicated when the UPL is created since the presence of one matching credential is sufficient for authentication of any given target device. Thus, as illustrated at FIG. 7 and FIG. 8, the TDL and the UPL may have a different number of entries since, for example, target devices on the TDL may share the same credential information.

As indicated above, in some instances target devices share a username but have different passwords. Accordingly, in some embodiments the above-described authentication process is based on passwords and not username-password pairs. For example, a list of passwords is provided to the source peer 501, the source peer 501 hashes the passwords, and sends the hashed passwords to the first target peer 502 for comparison. The first target peer 502 then compares a local hashed password with the hashed password list. In the case the local hashed password matches a value on the hashed password list, the first target peer 502 determines the source peer 501 is authenticated to the first target peer 502.

At step S619, the first target peer 502 sends the source peer 501 a message indicating the source peer 501 is authenticated to the first target peer 502 in a manner described with respect to step S315. In step S619, the message indicating the source peer 501 is authenticated to the first target peer 502 includes the matched hashed username-password pair.

After the authentication process is complete, the source peer 501 may proceed to distribute the configuration information.

At step S620, the source peer 501 determines the actual username-password pair of the first target peer 502. The source peer 501 uses the hashed UPL to map the matched hashed username-password pair received in step S619 to a username-password pair on the UPL. That is, the source peer 501 compares the matched hashed username-password pair received in step S619 to the hashed UPL and determines a match. Then, based on the match, the source peer 501 determines the actual username-password pair for the first target peer 502 based on the UPL.

At step S621, the source peer 501 encrypts the configuration information using an encryption key generated using the challenge and the actual username-password pair for the first target peer 502. A number of encryption methods known to those of ordinary skill in the art may be used to encrypt the configuration information.

At step S622, the source peer 501 sends the encrypted configuration information to the first target peer 502.

At Step S623, the first target peer 502 decrypts the configuration information using a decryption key generated using the challenge and the local username-password pair of the first target peer 502. At step S624, the first target peer 502 stores the configuration information to the hard disk of the first target peer 502. Accordingly, the first target peer 502 is configured.

Then, at step S625, the first target peer 502 sends a configuration success message to the source peer 501. At step S626, the first target peer 502 ends the session with the source peer 501.

FIG. 9 illustrates an example of a hardware configuration of a multifunction peripheral (MFP) according to embodiments of the present invention. The peers 501-504 which execute various processes of the invention may be configured in the same or a similar manner as the MFP 900 of FIG. 9.

For each of the hardware components of FIG. 9, there is a corresponding hardware component in FIG. 4, except for the printer unit 910 and the scanner unit 911. Descriptions of components already described with respect to FIG. 4 apply to the corresponding components of FIG. 9 and are not repeated herein. Regarding the printer unit, the printer unit 910 is a device for printing on a sheet an image corresponding to image data. Regarding the scanner unit, the scanner unit 911 is a device for converting image information on a paper document into electric signal data using an optical scanner device.

Embodiments of the present invention include determining at the second computing device 102 to end a process of authenticating the first computing device 101 to the second computing device 102 based on whether a predetermined condition is satisfied. For example, the predetermined condition may be a number of failed match attempts by the second computing device 102. Thus, in a case where five failed match attempts is set as the predetermined condition for ending the authentication process, the second computing device 102 ends the process of authenticating the first computing device 101 to the second computing device 102 after five match attempts even though there may be additional values remaining with which the second computing device 102 could compare the local value.

According to embodiments of the present invention, a single computing device is configured to execute the functions of the first computing device 101 or source peer 501 during a first authentication process, and to execute the functions of the second computing device 102 or first target peer 502 during a second authentication process.

The above description serves to explain principles of the invention; but the invention should not be limited to the examples described above. For example, the order and/or timing of some of the various communications between computing devices may vary from the examples given above without departing from the scope of the invention. Further by way of example, the type of network and/or computing devices may vary from the examples given above without departing from the scope of the invention. Other variations from the above-recited examples may also exist without departing from the scope of the invention.

The scope of the present invention includes a computer-readable storage medium that stores computer-executable instructions for causing a computer to execute one or more embodiments of the invention described herein.

Examples of a computer-readable storage medium include a floppy disk, a hard disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A method for authenticating a first computing device to one or more other computing devices, the method comprising:
   receiving, at a first computing device, a first credential and a second credential, the first credential for authenticating to a second computing device, the second credential for authenticating to a third computing device, the first credential different from the second credential;
   sending, from the first computing device to the second computing device, a first message that includes the first credential and the second credential;
   sending, from the first computing device to the third computing device, a second message that includes the first credential and the second credential;
   receiving, at the first computing device from the second computing device, a response to the first message, the response to the first message comprising information indicating whether the first computing device is authenticated to the second computing device; and
   receiving, at the first computing device from the third computing device, a response to the second message, the response to the second message comprising information indicating whether the first computing device is authenticated to the third computing device.

2. The method of claim 1, wherein the first message further includes first identification data paired with the first credential, the first identification data for use in conjunction with the first credential for authenticating to the second computing device,
   wherein the first message further includes second identification data paired with the second credential, the second identification data for use in conjunction with the second credential for authenticating to the third computing device,
   wherein the second message further includes the first identification data paired with the first credential, and
   wherein the second message further includes the second identification data paired with the second credential.

3. The method of claim 1, wherein the first credential is a first password and the second credential is a second password, the first password different from the second password.

4. The method of claim 1, wherein the sending the first message comprises sending the first message using a secure connection.

5. The method of claim 1, wherein the receiving the response to the first message comprises receiving, at the first computing device from the second computing device, a message indicating the first computing device is authenticated to the second computing device.

6. The method of claim 5, further comprising:
   in response to the receiving the message indicating the first computing device is authenticated to the second computing device, sending, from the first computing device to the second computing device, configuration information.

7. The method of claim 1, wherein the first computing device and the second computing device are peers.

8. A computer-readable storage medium storing computer-executable instructions for causing a computer to execute operations comprising:
   receiving, at a first computing device, a first credential and a second credential, the first credential for authenticating to a second computing device, the second credential for authenticating to a third computing device, the first credential different from the second credential;
   sending, from the first computing device to the second computing device, a first message that includes the first credential and the second credential;
   sending, from the first computing device to the third computing device, a second message that includes the first credential and the second credential;
   receiving, at the first computing device from the second computing device, a response to the first message, the response to the first message comprising information indicating whether the first computing device is authenticated to the second computing device; and
   receiving, at the first computing device from the third computing device, a response to the second message, the response to the second message comprising information indicating whether the first computing device is authenticated to the third computing device.

9. The method of claim 1, wherein the receiving the first credential and the second credential comprises receiving, at the first computing device, the first credential and the second credential without an indication that the first credential is for authenticating to the second computing device and without an indication that the second credential is for authenticating to the third computing device.

10. A method for authenticating a first computing device to one or more other computing devices, the method comprising:
- receiving, at a first computing device, a first credential and a second credential, the first credential for authenticating to a second computing device, the second credential for authenticating to a third computing device, the first credential different from the second credential;
- sending, from the first computing device to the second computing device, a first message that includes a first hash value and a second hash value, the first hash value generated based on the first credential, the second hash value generated based on the second credential;
- sending, from the first computing device to the third computing device, a second message that includes a third hash value and a fourth hash value, the third hash value generated based on the first credential, the fourth hash value generated based on the second credential;
- receiving, at the first computing device from the second computing device, a response to the first message, the response to the first message comprising information indicating whether the first computing device is authenticated to the second computing device; and
- receiving, at the first computing device from the third computing device, a response to the second message, the response to the second message comprising information indicating whether the first computing device is authenticated to the third computing device.

11. The method of claim 10, further comprising:
- receiving, at the first computing device from the second computing device, a challenge, wherein the first message is a response to the challenge.

12. The method of claim 11, further comprising:
- generating, at the first computing device, the first hash value based on the challenge and the first credential; and
- generating, at the first computing device, the second hash value based on the challenge and the second credential.

13. The method of claim 12, wherein the challenge comprises a random number,
- wherein the generating the first hash value comprises applying a one-way function to the challenge and the first credential to generate the first hash value, and
- wherein the generating the second hash value comprises applying the one-way function to the challenge and the second credential to generate the second hash value.

14. The method of claim 11, further comprising:
- receiving, at the first computing device from the third computing device, a second challenge, wherein the second message is a response to the second challenge.

15. The method of claim 14, further comprising:
- generating, at the first computing device, the first hash value based on the challenge and the first credential;
- generating, at the first computing device, the second hash value based on the challenge and the second credential;
- generating, at the first computing device, the third hash value based on the second challenge and the first credential; and
- generating, at the first computing device, the fourth hash value using based on the second challenge and the second credential.

16. The method of claim 14, further comprising:
- sending, from the first computing device to the second computing device, a first access request prior to the receiving the challenge; and
- sending, from the first computing device to the third computing device, a second access request prior to the receiving the second challenge.

17. The method of claim 10, wherein the first message further includes a fifth hash value paired with the first hash value, the fifth hash value generated based on first identification data for use in conjunction with the first credential for authenticating to the second computing device, and
- wherein the first message further includes a sixth hash value paired with the second hash value, the sixth hash value generated based on second identification data for use in conjunction with the second credential for authenticating to the third computing device.

18. The method of claim 17, further comprising:
- receiving, at the first computing device from the second computing device, a challenge, wherein the first message is a response to the challenge;
- generating, at the first computing device, the first hash value using based on the challenge and the first credential;
- generating, at the first computing device, the second hash value using based on the challenge and the second credential;
- generating, at the first computing device, the fifth hash value based on the challenge and the first identification data; and
- generating, at the first computing device, the sixth hash value based on the challenge and the second identification data.

19. A computer-readable storage medium storing computer-executable instructions for causing a computer to execute operations comprising:
- receiving, at a first computing device, a first credential and a second credential, the first credential for authenticating to a second computing device, the second credential for authenticating to a third computing device, the first credential different from the second credential;
- sending, from the first computing device to the second computing device, a first message that includes a first hash value and a second hash value, the first hash value generated based on the first credential, the second hash value generated based on the second credential;
- sending, from the first computing device to the third computing device, a second message that includes a third hash value and a fourth hash value, the third hash value generated based on the first credential, the fourth hash value generated based on the second credential;
- receiving, at the first computing device from the second computing device, a response to the first message, the response to the first message comprising information indicating whether the first computing device is authenticated to the second computing device; and
- receiving, at the first computing device from the third computing device, a response to the second message, the response to the second message comprising information indicating whether the first computing device is authenticated to the third computing device.

20. The method of claim 10, wherein the receiving the response to the first message comprises receiving, at the first computing device from the second computing device, a message indicating the first computing device is authenticated to the second computing device.

21. The method of claim 20, further comprising:
- in response to the receiving the message indicating the first computing device is authenticated to the second computing device, sending, from the first computing device to the second computing device, configuration information.

22. The method of claim 10, wherein the receiving the first credential and the second credential comprises receiving, at the first computing device, the first credential and the second credential without an indication that the first credential is for authenticating to the second computing device and without an indication that the second credential is for authenticating to the third computing device.

23. A computing device comprising:
one or more processors; and
one or more computer-readable media coupled to the one or more processors, the one or more computer-readable media storing instructions that, when executed by the one or more processors, cause the one or more processors to perform operations comprising:
receiving, at a first computing device, a first credential and a second credential, the first credential for authenticating to a second computing device, the second credential for authenticating to a third computing device, the first credential different from the second credential;
sending, from the first computing device to the second computing device, a first message that includes the first credential and the second credential;
sending, from the first computing device to the third computing device, a second message that includes the first credential and the second credential;
receiving, at the first computing device from the second computing device, a response to the first message, the response to the first message comprising information indicating whether the first computing device is authenticated to the second computing device; and
receiving, at the first computing device from the third computing device, a response to the second message, the response to the second message comprising information indicating whether the first computing device is authenticated to the third computing device.

24. The computing device of claim 23, wherein the first message further includes first identification data paired with the first credential, the first identification data for use in conjunction with the first credential for authenticating to the second computing device,
wherein the first message further includes second identification data paired with the second credential, the second identification data for use in conjunction with the second credential for authenticating to the third computing device,
wherein the second message further includes the first identification data paired with the first credential, and
wherein the second message further includes the second identification data paired with the second credential.

25. The computing device of claim 23, wherein the receiving the response to the first message comprises receiving, at the first computing device from the second computing device, a message indicating the first computing device is authenticated to the second computing device.

26. The computing device of claim 25, the operations further comprising:
in response to the receiving the message indicating the first computing device is authenticated to the second computing device, sending, from the first computing device to the second computing device, configuration information.

27. The computing device of claim 23, wherein the receiving the first credential and the second credential comprises receiving, at the first computing device, the first credential and the second credential without an indication that the first credential is for authenticating to the second computing device and without an indication that the second credential is for authenticating to the third computing device.

28. A computing device comprising:
one or more processors; and
one or more computer-readable media coupled to the one or more processors, the one or more computer-readable media storing instructions that, when executed by the one or more processors, cause the one or more processors to perform operations comprising:
receiving, at a first computing device, a first credential and a second credential, the first credential for authenticating to a second computing device, the second credential for authenticating to a third computing device, the first credential different from the second credential;
sending, from the first computing device to the second computing device, a first message that includes a first hash value and a second hash value, the first hash value generated based on the first credential, the second hash value generated based on the second credential;
sending, from the first computing device to the third computing device, a second message that includes a third hash value and a fourth hash value, the third hash value generated based on the first credential, the fourth hash value generated based on the second credential;
receiving, at the first computing device from the second computing device, a response to the first message, the response to the first message comprising information indicating whether the first computing device is authenticated to the second computing device; and
receiving, at the first computing device from the third computing device, a response to the second message, the response to the second message comprising information indicating whether the first computing device is authenticated to the third computing device.

* * * * *

UNITED STATES PATENT AND TRADEMARK OFFICE
CERTIFICATE OF CORRECTION

PATENT NO.       : 8,839,357 B2                                     Page 1 of 1
APPLICATION NO.  : 12/976991
DATED            : September 16, 2014
INVENTOR(S)      : Jiuyuan Ge It is certified that error appears in the above-identified patent and that said Letters Patent is hereby corrected as shown below:

IN THE CLAIMS

In Claim 15, column 17, line 59, replace "value using based on" with --value based on--.

In Claim 18, column 18, line 16, replace "value using based on" with --value based on--.

In Claim 18, column 18, line 19, replace "value using based on" with --value based on--.

Signed and Sealed this
Twenty-eighth Day of June, 2016

Michelle K. Lee
*Director of the United States Patent and Trademark Office*